Sept. 1, 1959　　W. S. CLEVENGER ET AL　　2,902,271
WEIGHT INDICATING DEVICE FOR BOTTLED GAS TANKS
Filed Jan. 10, 1958
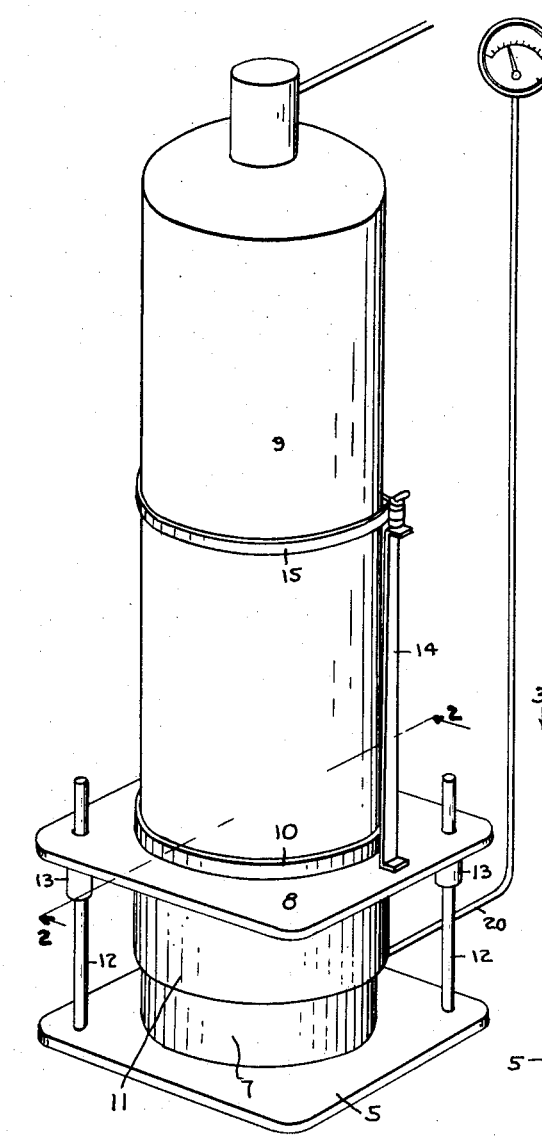
Fig. 1.
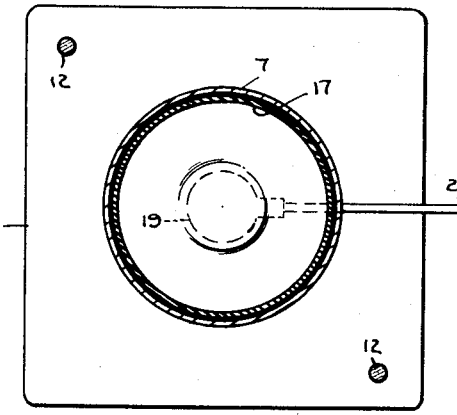
Fig. 2.
Fig. 3.
INVENTORS
WALTON S. CLEVENGER
JACOB H. DELL
BY
*James H. Pyle*
ATTORNEY

United States Patent Office 2,902,271
Patented Sept. 1, 1959

2,902,271

WEIGHT INDICATING DEVICE FOR BOTTLED GAS TANKS

Walton S. Clevenger and Jacob H. Dell, West Hollywood, Fla.

Application January 10, 1958, Serial No. 708,115

2 Claims. (Cl. 265—47)

This invention relates broadly to weighing devices and has particular reference to a device for indicating a constant weight of fuel tanks and their contents, particularly fuel tanks of the recognized "bottled gas."

Bottled gas tanks are normally arranged upon the exterior of a building upon a suitable support and with the tank being provided at its upper end with a valved coupling for controlling a fluid line to the interior of the building for connection with conventional appliances, such as cooking ranges, water heaters or the like. Heretofore it has been impossible for the user to know just how much liquified fluid remained in the tank and it frequently happens, that the fuel will become exhausted at a critical time, during the cooking of meals or at night when it is not possible normally to obtain service and the purpose of this device is to indicate at all times the remaining contents of the tank so that the user will be aware and replenish the supply before it has become exhausted. The device of the present invention contemplates a weighing device embodying a base and an overlying supporting platform for the support of the tank and with inflated bladder means being disposed between the base and the platform that is connected through a compressed air fluid line to a suitable gauge and with the gauge being arranged in a convenient position for visual observation of the user at all times.

Novel features of construction and operation of the device will be more apparent during the course of the following description, reference being had to the accompanying drawings wherein has been illustrated a preferred form of the device and wherein like characters of reference are employed to denote like parts throughout the several figures.

In the drawings:

Figure 1 is a perspective view of a weighing device constructed in accordance with the invention, Figure 2 is a fragmentary vertical section, taken substantially on line 2—2 of Figure 1 and, Figure 3 is a horizontal section taken substantially on line 3—3 of Figure 2.

Referring specifically to the drawings, the numeral 5 designates a base plate, preferably formed of metal although any other desirable materials may be employed. The base plate is anchored in a suitable manner in the selected position calculated for the removable support of a fluid gas tank. The base plate is provided with an upstanding cylindrical flange 7, preferably formed centrally thereof. Movable toward and from the base plate 5 is a supporting platform 8, calculated to form a rest for a conventional bottle gas receptacle or tank 9. The platform 8 is provided with an upstanding ring 10, that serves to center the tank 9 with respect to the platform 8. The platform 8 is provided with a depending cylindrical flange 11, that is concentric with the ring 10 and adapted to have telescopic engagement with the flange 7. The base 5 is provided at two diametrically opposite corners with vertically arranged rods 12, that receive sleeves 13 carried by the platform 8 and that serve to steady or retard any tendency of the platform to tilt laterally. Any suitable means may be employed to prevent accidental tilting of the tank 9, such as a pair of upstanding straps 14 having a separable clamping band 15 that embraces the tank. Other means may be employed if desired although, the means 14 and 15 may be omitted and a clamping band having tie devices may be employed if desired.

The telescoping flanges 7 and 11 serve to provide a cylindrical chamber 16. Disposed within the chamber 16 to substantially fill the same, is a compressible bladder device 17, formed of rubber or other suitable materials capable of being flexed. The bladder 17 is cylindrical in shape and is provided with flat upper and lower walls 18. The bladder 17 is inflated in any desirable manner to a suitable pressure, calculated in accordance with the weight of the tank 9 and its contents or any other object to be supported upon the platform 8 and whereby the tank may be supported without wholly collapsing the bladder. Disposed upon the base 5, centrally thereof and underlying the bottom wall 18 of the bladder 17 is a second compressible and relatively small bladder 19. The bladder 19 has communication with a relatively small tubular conduit 20, that passes outwardly through an opening 21 formed in the flange 7 and with the conduit having communication at its remote end, with a sight gauge 22, such as a pressure actuated gauge. The gauge 22 is preferably disposed at a convenient point for visual observation by the user of the gas product and it is contemplated, that the gauge shall be arranged within the building at a point adjacent the appliance most frequently used, such as the cooking range. The gauge will obviously be calibrated to read in pounds and "empty" and "full." It is understood of course bottled gas is normally sold liquified in form and in accordance with weight, rather than volume. The bladder 19 is inflated in any desirable manner to a required pressure so that the bladder and the conduit 20 will maintain a predetermined pressure at installation. The bladder 19 is compressible by the bladder 17 when a weighted article is supported upon the platform 8.

The bladder 17 may be substituted by other bladders having different dimensions capable of being disposed within the chamber 16 and pressurized in order to accommodate fuel tanks 9 of different sizes and it will be obvious, that fuel tanks having varying capacities may be readily supported upon the platform and register their contents in pounds weight upon the gauge 22, it being also understood that the bladder 17 constitutes the supporting medium for the tank and tanks of different sizes obviously vary in weight when empty and it must of necessity require that the bladder support the tank in an empty condition without registering above the empty marking upon the gauge and the calibrating of the pressures in the different bladders 17 will be in accordance with the particular tank to be supported.

In the use of the device, the base 5 is anchored at the pre-determined point after which, the bladders 17 and 19 are assembled within the flange 7 and then the platform 8 and its flange 11 are engaged thereover to rest upon the upper flat wall of the bladder 17. The conduit 20 is trained through a suitable opening in the building and the gauge 22 mounted at the desired point. An empty tank 9 supported upon the platform will fail to register any weight upon the gauge 22 however, when a fully loaded tank 9 is supported upon the platform, the bladder 17 will be compressed and through such will compress the small bladder 19, registering the "full" marking upon the gauge 22. As the fuel is used, the weight upon the bladder 17 is progressively relieved, causing the gauge to progressively move toward the "empty" marking upon the gauge and will at all times register the number of pounds of liquified fuel remaining in the tank. The user will at all times be able to determine the condition of the tank and will thereby avoid the danger of the tank becoming exhausted at a most inconvenient time. As before stated, the weight indicating device readily adapts itself to other sizes of tanks by the mere substitution of different bladders 17, since there are numerous sizes and weights of tanks presently being employed in those areas situated beyond the normal supply lines for manufactured gas.

It will be apparent that there has been provided a very simple means for providing a visual indicator for the fluid contents of liquified gas tanks commonly referred to as bottled gas. The structure is economical to manufacture, is strong, durable, provides a bladder means that are well protected against the elements and against the danger of children or others damaging the bladder 17 by puncturing or the like. The platform 8 rises and falls in accordance with the weight supported thereon. It is contemplated that the parts, including the base 5, the platform 8 and the flanges shall be formed of suitable metal calculated to resist rusting and the parts may be formed of aluminum as an example of a material capable of withstanding weather conditions, since the device is usually mounted upon the exterior of the building. The bladders may be formed of any desirable corded rubber capable of constant flexing without cracking.

It is to be understood that the invention is not limited to the precise construction shown, but that changes are contemplated as readily fall within the spirit of the invention as shall be determined by the scope of the subjoined claims.

Having described our invention, what we claim as new and desire to secure by Letters Patent is:

1. A constant and progressive weight indicating device for the contents of tanks that are employed to store and dispense liquified bottled gas, comprising a base plate, a platform overlying the base plate parallel thereto and movable in a vertical plane toward and from the base plate, guide means for the platform in its vertical movement, an inflated bladder device disposed between the base plate and the platform and whereby to support the platform and a tank of bottled gas supported thereon, the bladder being compressible to a predetermined degree under the combined weight of the tank and its maximum contents, the bladder being progressively expandable to elevate the tank and its contents as the liquified gas is withdrawn therefrom, a second inflated bladder device disposed beneath the first named bladder, a compressed air actuated gauge and a compressed air line leading from the gauge to the second bladder device, the second bladder device being compressible under the compressive influence of the first bladder device, the second bladder device being compressed to its maximum degree when a full tank of liquified gas is disposed upon the platform and whereby to actuate the gauge to indicate a full condition, the second bladder being progressively expanded as the first bladder expands as the gas is withdrawn from the tank to relieve the weight upon the platform and whereby to progressively actuate the gauge to indicate the remaining weight of the tank contents, and means carried by the base and the platform for protecting the first named bladder, the first named bladder being cylindrical and provided with upper and lower flat ends that support the platform in a horizontal manner, the said second bladder being relatively small and disposed beneath and in underlying contacting engagement with the lower flat wall of the first bladder and in centered axial relation thereto.

2. A constant and progressive weight indicating device for the contents of tanks that are employed to store and dispense liquified bottled gas, comprising a base plate, a platform overlying the base plate parallel thereto and movable in a vertical plane toward and from the base plate, guide means for the platform in its vertical movement, an inflated bladder device disposed between the base plate and the platform and whereby to support the platform and a tank of bottled gas supported thereon, the bladder being compressible to a predetermined degree unedr the combined weight of the tank and its maximum contents, the bladder being progressively expandable to elevate the tank and its contents as the liquified gas is withdrawn therefrom, a second inflated bladder device disposed beneath the first named bladder, a compressed air actuated gauge and a compressed air line leading from the gauge to the second bladder device, the second bladder device being compressible under the compressive influence of the first bladder device, the second bladder device being compressed to its maximum degree when a full tank of liquified gas is disposed upon the platform and whereby to actuate the gauge to indicate a full condition, the second bladder being progressively expanded as the first bladder expands as the gas is withdrawn from the tank to relieve the weight upon the platform and whereby to progressively actuate the gauge to indicate the remaining weight of the tank contents, and means carried by the base and the platform for protecting the first named bladder, the said base being provided with an upstanding cylindrical flange and with the flanges being telescopic, the said telescopic flanges forming a cylindrical chamber for the housing of the first named bladder, the platform having an upstanding cylindrical flange that is concentric with the depending flange whereby to center the tank upon the platform and to dispose its weight in direct axial alignment with the first named bladder.

References Cited in the file of this patent

UNITED STATES PATENTS

| 1,070,460 | Harback | Aug. 19, 1913 |
| 1,536,614 | Mackey | May 5, 1925 |
| 1,844,080 | Troll | Feb. 9, 1932 |
| 1,994,388 | Ericksen | Mar. 12, 1935 |
| 2,577,100 | Alvarez | Dec. 4, 1951 |

FOREIGN PATENTS

| 79,247 | Germany | Feb. 16, 1895 |
| 28,546 | Switzerland | Mar. 25, 1903 |
| 806,967 | France | Oct. 5, 1936 |
| 1,028,624 | France | Feb. 25, 1953 |